United States Patent Office 3,284,346
Patented Nov. 8, 1966

3,284,346
MOLECULAR SIEVE SEPARATION OF HYDROCARBON MIXTURES BOILING ABOVE $C_9$ HYDROCARBONS
Roger Hilary Anstey and Robert Marshall Macnab, Sunbury-on-Thames, England, assignors to The British Petroleum Company Limited, London, England, a British joint-stock company
No Drawing. Filed Feb. 7, 1964, Ser. No. 343,213
Claims priority, application Great Britain, Feb. 10, 1963, 30,742/63
15 Claims. (Cl. 208—310)

This invention relates to the separation of hydrocarbon mixtures using molecular sieves and particularly to the separation of straight-chain hydrocarbons from petroleum fractions.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It has previously been proposed to treat petroleum fractions ranging from gasoline to gas-oils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered as a product if desired.

Processes hitherto disclosed for the separation of straight-chain hydrocarbons from hydrocarbon mixtures using molecular sieves have generally comprised an absorption stage and a desorption stage with or without an intervening purge stage. The feed is contacted with the sieve in the absorption stage in which the straight-chain hydrocarbons are absorbed, non-straight-chain hydrocarbons passing out as effluent. The absorbed straight-chain hydrocarbons are recovered during the desorption stage, for example by reducing the pressure or by eluting with an inert gas or a straight-chain hydrocarbon of different boiling point to those absorbed. A purge stage, if employed, serves to remove non-straight-chain hydrocarbons adhering to the surface of the sieve at the end of the absorption stage. Purging is carried out, for example, by means of an inert gas such as nitrogen or a light straight-chain hydrocarbon such as n-butane, the conditions being adjusted to minimise desorption of straight-chain hydrocarbons.

According to the present invention, a process for separating straight-chain hydrocarbons from mixtures containing the same together with branched-chain and/or cyclic hydrocarbons comprises diluting the feedstock with an inert gas or a low-boiling straight-chain hydrocarbon, contacting the diluted feedstock with a 5 A. molecular sieve in a first, absorption, stage, removing non-absorbed material from the sieve surface in a second, purge, stage, and desorbing straight-chain hydrocarbons in a third, desorption, stage by reducing the pressure to below that employed in the absorption stage, all three stages being operated in the vapour phase.

By "low-boiling" with reference to the diluent above is meant lower boiling than the lowest boiling hydrocarbon in the feedstock and having a critical temperature lower than the temperature employed in the absorption stage.

The process is particularly suitable for treating hydrocarbon fractions, preferably those boiling in the range $C_9$ and above, particularly those boiling between $C_{10}$–$C_{20}$. The use of the diluent aids the complete vaporisation of the feed, leading to better dispersion through the sieve bed, thereby increasing the rate of absorption. Suitable feed diluents include n-paraffins from $C_1$–$C_8$, preferably n-pentene, and inert gases, preferably nitrogen.

The process is preferably operated isothermally at a temperature within the range 300–400° C., particularly 350–380° C. The absorption is preferably operated at a pressure within the range 65–265 p.s.i.a., particularly 90–165 p.s.i.a., and during the desorption stage the pressure is reduced to between 0.01–2.0 p.s.i.a., preferably 0.2–0.5 p.s.i.a.

Purging may be conducted either by passing a suitable medium through the bed, preferably at the same pressure as that employed during the absorption stage, or alternatively by reducing the pressure in the purge stage to a value intermediate those of the absorption and desorption pressures, preferably 1.0–7.5 p.s.i.a., particularly 1.5–4.0 p.s.i.a.

Where purging is carried out using a purging medium, this medium is preferably the diluent used in the absorption stage. Preferably the purge medium is passed counter-currently through the sieve, i.e. in the opposite direction to that in which the feedstock is passed. The non-normal hydrocarbons which accumulate on the sieve surface and in the interstices between sieve particles during the absorption stage are concentrated at the feed inlet. By purging counter-currently, therefore, these materials are removed relatively easily whereas co-current purging would mean that they would have to be displaced along the whole length of the sieve bed. Desorption preferably takes place in the co-current direction.

Where purging is carried out by reducing the purge stage pressure, the pressure is desirably released in a direction counter-current to that in which the feed is passed, or preferably in both the counter- and co-current directions. Desorption also preferably takes place in the both co- and counter-current directions.

Desorption may be assisted by the admission of a bleed of the diluent into the vacuum desorption stage, preferably at the rate of 1–50 v./v./hr., and preferably at a pressure of 0.1–2.0 p.s.i.a. In this manner, the partial pressure of the sorbate is reduced and the diluent also serves as a transport agent for the desorbed hydrocarbons.

The invention is illustrated by means of the following examples:

Example 1

A $C_9-C_{14}$ kerosene feedstock was treated with a 5 A. molecular sieve in a three-stage isothermal process under the following conditions:

TABLE 1

| Stage | Agent | Temperature, °C. | Pressure | Space Velocity | Duration |
|---|---|---|---|---|---|
| Absorption | Feed | 380 | 150 p.s.i.g. | 1.0 LHSV | 6 mins. |
|  | Nitrogen |  |  | 75 GHSV |  |
| Purge | Nitrogen | 380 | 150 p.s.i.g. | 75 GHSV | 6 mins. |
| Desorption: |  |  |  |  |  |
| (i) |  | 380 | 150–0 p.s.i.g. |  | 1 min. |
| (ii) |  |  | 0 p.s.i.g.–0.35 p.s.i.a. |  | 6 mins. |

A yield of 3% sieve weight/hour of n-paraffins was obtained with a purity of 97% weight, and a carbon number distribution substantially the same as the feed.

For comparison, operation without dilution under the following conditions gave the results indicated:

TABLE 2

| Stage | Agent | Temperature, °C. | Pressure, p.s.i.a. | Space Velocity | Duration, mins. |
|---|---|---|---|---|---|
| Absorption | Feed | 380 | 65 | 0.7 LHSV | 10 |
| Purge | Nitrogen | 380 | 65 | 70 GHSV | 6 |
| Desorption |  | 380 | 65 |  |  |
|  |  |  | 0.3 |  | 10 |

A yield of 2.2% sieve weight/hour of normal paraffins was obtained with a purity of 85% wt.

Example 2

A desulphurised kerosine feedstock of Middle East origin containing 25.6% weight of normal paraffins in the $C_{10}-C_{16}$ range were processed under the following conditions, with purging taking place in both co- and counter-current directions.

TABLE 3

| Stage | Agent | Temperature, °C. | Pressure, p.s.i.a. | Space Velocity | Duration, mins. |
|---|---|---|---|---|---|
| Absorption | Feed | 380 | 130 | 0.8 LHSV | 3 |
|  | Nitrogen |  |  | 200 GHSV |  |
| Purge |  | 380 | 3.0 |  | 2 |
| Desorption |  | 380 | 0.4 |  | 4 |

The yield of normal paraffins was 4.0% sieve weight/hour, with a purity of 97.5% weight, and a carbon number distribution substantially the same as the feed.

For comparison, operation without dilution under the following conditions gave the results indicated below:

TABLE 4

| Stage | Agent | Temperature, °C. | Pressure, p.s.i.a. | Space Velocity | Duration, mins. |
|---|---|---|---|---|---|
| Absorption | Feed | 380 | 65 | 0.4 LHSV | 10 |
| Purge |  | 380 | 0.8 |  | 5 |
| Desorption |  | 380 | 0.1 |  | 10 |

A yield of 1.5% sieve weight/hour of normal paraffins was obtained with a purity of 92% weight.

Example 3

The effect of a nitrogen bleed during desorption is illustrated as follows using the same feedstock as in Example 2. The purge stage was conducted simultaneously in a co- and counter-current direction.

TABLE 5

| Stage | Agent | Temperature, °C. | Pressure, p.s.i.a. | Space Velocity | Duration, mins. |
|---|---|---|---|---|---|
| Absorption | Feed | 380 | 115 | 0.6 LHSV | 4 |
|  | Nitrogen |  |  | 150 GHSV |  |
| Purge |  | 380 | 3.0 |  | 1.5 |
| Desorption | Nitrogen | 380 | 0.2 | 35 GHSV | 6.5 |

The yield of normal paraffins was 4.7% sieve weight/hour, with a purity of 97% weight, and a carbon number distribution substantially the same as the feed.

We claim:

1. A process for separating straight-chain hydrocarbons from a petroleum fraction boiling above $C_9$ comprising diluting the feedstock with a diluent selected from the group consisting of an inert gas and a low boiling straight-chain hydrocarbon, contacting the diluted feedstock at an elevated temperature and in the vapor phase with a 5 A. molecular sieve in an absorption stage, purging said molecular sieve in the vapor phase to remove non-absorbed material from the sieve surface thereof, and subjecting said molecular sieve to a desorption stage at an elevated temperature and in the vapor phase and at a pressure below that employed in the absorption stage to obtain straight-chain hydrocarbons.

2. A process as claimed in claim 1 wherein the feedstock is a hydrocarbon fraction boiling in the range $C_{10}$–$C_{20}$.

3. A process as claimed in claim 1 wherein the diluent is nitrogen.

4. A process as claimed in claim 1 which is operated isothermally at a temperature within the range 300–400° C.

5. A process as claimed in claim 1 wherein the absorption stage is operated at a pressure of 65–265 p.s.i.a., and during the desorption stage the pressure is reduced to between 0.01–2.0 p.s.i.a.

6. A process as claimed in claim 1 wherein purging is conducted by passing a purging medium through the sieve bed at the same pressure as that employed during the absorption stage.

7. A process as claimed in claim 6 wherein the purging medium is the diluent employed in the absorption stage.

8. A process as claimed in claim 6 wherein the purging medium is passed counter-currently through the sieve.

9. A process as claimed in claim 1 wherein purging is conducted by reducing the pressure in the purge stage to a value intermediate those of the absorption and desorption stages.

10. A process as claimed in claim 9 wherein the purge stage pressure is reduced to 1.0–7.5 p.s.i.a.

11. A process as claimed in claim 9 wherein the pressure is released in a direction counter-current to that in which the feed is passed.

12. A process as claimed in claim 11 wherein the pressure is released in both the counter- and co-current directions.

13. A process as claimed in claim 9 wherein desorption is assisted by the admission of a bleed of the diluent into the vacuum desorption stage.

14. A process as claimed in claim 13 wherein the bleed is admitted at the rate of 1–50 v./v./hr.

15. A process as claimed in claim 13 wherein desorption is conducted at a pressure within the range 0.1–2.0 p.s.i.a.

References Cited by the Examiner

UNITED STATES PATENTS

| | | | |
|---|---|---|---|
| 3,030,431 | 4/1962 | Mattox et al. | 260—676 |
| 3,037,338 | 6/1962 | Snyder | 260—676 |
| 3,061,654 | 10/1962 | Gensheimer et al. | 260—676 |
| 3,095,288 | 6/1963 | Sensel | 260—676 |
| 3,106,593 | 10/1963 | Benesi et al. | 260—676 |
| 3,132,079 | 5/1964 | Eppelley et al. | 260—676 |
| 3,244,619 | 4/1966 | Franz et al. | 208—310 |

ALPHONSO D. SULLIVAN, *Primary Examiner.*